July 16, 1974  J. BRYAN ET AL  3,824,088
WELDED MULTIPLE GLAZING UNITS
Filed Aug. 23, 1972  3 Sheets-Sheet 1

United States Patent Office 3,824,088
Patented July 16, 1974

3,824,088
WELDED MULTIPLE GLAZING UNITS
John Bryan and Frederick Harry Hart, St. Helens, England, assignors to Pilkington Brothers Limited, Liverpool, England
Filed Aug. 23, 1972, Ser. No. 283,022
Int. Cl. C03b 23/20, 23/24
U.S. Cl. 65—40
12 Claims

ABSTRACT OF THE DISCLOSURE

A welded multiple glazing unit is manufactured by forming a continuous peripheral weld uniting the margins of assembled glass sheets by passing electrical heating currents to the glass sheets between marginal positions spaced apart around the periphery of the assembled glass sheets, and directing cooling gas at the peripheral weld during passage of the electrical heating currents. The electrical currents and cooling gas may be supplied through a combined electrode and gas supply passage located on the corners of the unit.

BACKGROUND OF THE INVENTION

The present invention relates to the manufacture of welded multiple glazing units.

In the manufacture of all glass welded multiple glazing units, such as double glazing units, sheets of glass to form a unit are cut to size, cleaned, assembled, preheated, and then delivered to a welding station. At the welding station the edges of the assembled sheets are heated until they unite, and the sheets are drawn apart to establish an air space between adjacent sheets whilst the peripheral weld is still soft and capable of retaining a continuous connection of the sheet peripheries. The welded glass sheets are held apart until the peripheral weld loses sufficient heat to become self-supporting. The welded unit is then removed from the welding station, annealed, and then flushed with gas to reduce the moisture content of the air space before the air space is sealed from atmosphere. A hole drilled in one of the sheets before the sheet is preheated permits air to enter the air space whilst the sheets are being drawn apart and the hole also permits the air space to be flushed with the dry gas. After the flushing operation the hole is closed with a sealing glass, resin, or other suitable material.

This invention concerns the step of forming the peripheral weld. In one known method, the upper surface of the upper sheet has a marginal stripe of electrically conducting material and heating currents are passed successively between adjacent electrodes spaced apart around the assembled glass sheets to heat the margins of the upper glass sheet successively. The temperature rises until the glass becomes electrically conductive and the heating currents are conducted through the heated margins of the sheets. The said margins then unite to form a continuous pripheral weld.

SUMMARY OF THE INVENTION

According to the invention a method of manufacturing welded multiple glazing units, comprises forming a continuous peripheral weld uniting the margins of assembled glass sheets by passing electrical heating currents to the glass sheets between marginal positions spaced apart around the periphery of the assembled glass sheets, and directing cooling gas at the peripheral weld during passage of the electrical heating currents. Preferably the cooling gas (e.g. air) is directed at the glass at said positions to which the heating currents are passed.

In one form of the invention the heating currents are repeatedly switched first between electrodes at a pair of said positions and then between electrodes at another pair of said positions. In this case, the cooling gas is directed at the glass at any one of said positions, either continuously during the passage of the heating currents, or only during the passage of the heating currents to said one position, or only during the intervals between the passage of the heating currents to said one position.

Preferably intermittent electrical heating currents are alternately passed between pairs of electrodes at diagonally opposite corners of the glass sheets. In this case an intermittent flow of cooling gas is preferably blown alternately onto the two pairs of diagonally opposite corners. Preferably the cooling gas is directed onto one pair of diagonally opposite corners while the heating currents are flowing through the electrodes at the other pair of diagonally opposite corners.

To carry out the aforesaid method, heating means may be used for welding the margins of the sheets, which heating means include electrodes disposed at the corners of the assembly of glass sheets, at least one of said electrodes comprising a pipe which is connected to electric supply means and a supply of cooling gas.

In an alternative arrangement said heating means include electrodes disposed at the corner positions of the assembly of glass sheets, at least one of said electrodes comprising at its free end, i.e. adjacent the glass, an electrode member and a surrounding pipe defining an annular passageway coaxial with the electrode member for the emission of cooling gas, said electrode member and said pipe being connected to electric supply means and cooling gas supply means respectively.

DESCRIPTION OF THE PREFERRED EMBODIMENTS

Figure 1:
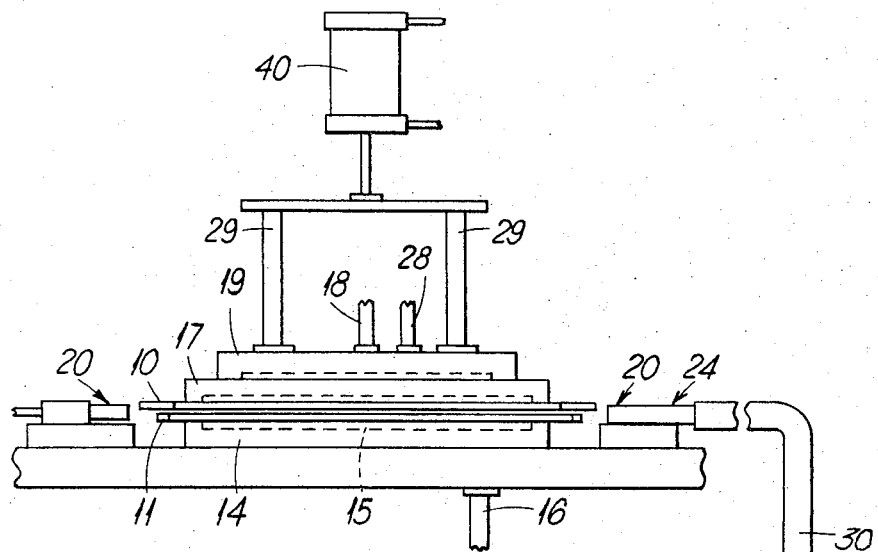
FIG 1 is a side elevation, partly in section, of an assembly of two glass sheets disposed in the welding station of apparatus for manufacturing a welded multiple glazing unit from said assembly, there being simultaneous heating and cooling means directed at each corner of the assembly, and the means on the left being of a different type from those on the right.
Figure 2:
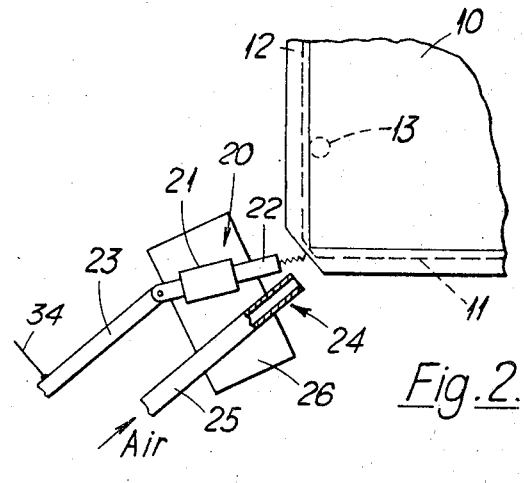
FIG. 2 is a plan view of one corner of the assembly of glass sheets and an enlarged view of one of the left-hand type of heating and cooling means shown in FIG. 1.
Figure 3:
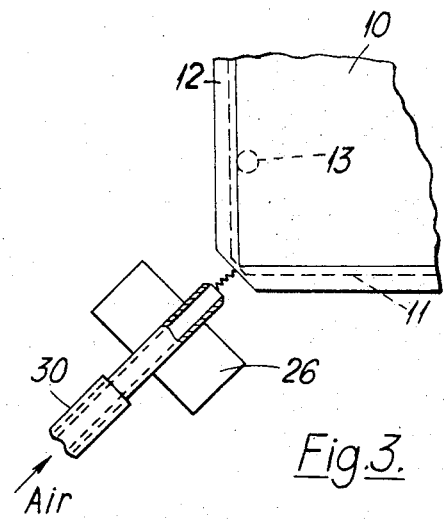
FIG. 3 is a plan view of another corner of the assembly of glass sheets and an enlarged view of the right-hand type of combined heating and cooling means shown in FIG. 1.

Referring to FIGS. 1 to 3, there is shown a welding station which comprises an intermediate stage in apparatus for manufacturing welded multiple glazing units. Upstream of the welding station there is disposed glass drilling, washing, drying, striping, preheating and conveying means which delivers into the welding station two overlying glass sheets 10, 11 which have been preheated to a temperature of about 550° C. and with the margins of the top sheet 10 striped at 12 (see FIGS. 2 and 3) on its top surface with electrically conducting material. The sheet 10 is slightly larger than the sheet 11 so as to overlap the lower sheet along all four edges. All corners of both sheets are cut away by notching or prenipping, as is shown in FIGS. 2 and 3. A hole 13 is drilled adjacent one of the margins of the lower sheet 11. The material constituting each stripe 12 is usually colloidal graphite which is painted on to the top sheet 10 before the assembly of sheets 10, 11 is preheated.

Downstream of the welding station is an annealing lehr, air space drying, hole sealing apparatus and conveying means for removing the welded units from the welding station and for conveying the welded units through the annealing lehr and the subsequent apparatus.

At the welding station, which is the position concerned with this invention, the assembled overlying glass sheets 10, 11 are supported on a lower platen 14 having recesses 15 in its upper surface which are connected to a vacuum source by a duct 16 so that the lower sheet 11 is clutched to platen 14. Similarly, the top sheet 10 is clutched to an upper vacuum platen 17 connected to a vacuum source by duct 18 and itself held to a clutch platen 19 connected to a vacuum source by duct 28. The clutch platen 19 is also fixed to a lifting and lowering jack 40 by rods 29.

The top glass sheet 10 is of larger dimensions than the upper vacuum platen 17 and similarly the lower sheet 11 is of larger dimensions than the lower vacuum platen 14. The lower sheet thus overlays the platen 14 on all sides normally by between 1 inch and 4½ inches. In the cases of relatively large overhang it may be desirable to support the overhanging corners of the lower sheet on soapstone blocks.

Electrodes 20 are disposed adjacent each corner of the assembly. Also, at each corner, there are provided means 24 for blowing cooling gas at the glass. In the drawings, two embodiments of electrode and cooling means are illustrated, one type on the left-hand side of FIG. 1 and in more detail in FIG. 2, and another type on the right-hand side of FIG. 1 and in more detail in FIG. 3. However, in practice, the same type of electrode and cooling means would be provided at each corner of the assembly of sheets to be united together.

With reference to FIG. 2, the electrode 20 comprises a holder 21 receiving a replaceable carbon inert 22. The holder is formed by stainless steel and is pivoted to a stainless steel rod 23 which is connected to electric supply means by a lead 34. The pivot between the rod 23 and the holder 21 allows the arc to be directed to the same position as the cooling gas. This cooling gas, in this example air, is emitted from a pipe 25 of refractory material disposed adjacent the electrode 20. If necessary, the pipe 25 has a section (not shown) of electrical insulating material intermediate its free end and gas supply means. The holder 21 and the free end of the pipe 25 are supported on a soapstone block 26.

In operation, a heating current is passed successively between the electrodes 20 at adjacent corners of the assembly through the electrically conductive stripes 12 so that the four margins of the top sheet 10 are successively heated. Current flowing through the stripes 12 causes the glass beneath the stripes to be heated and when the glass becomes electrically conductive the temperature rises further and the stripes burn off and the heating current is conducted through the heated margins of the sheet 10. Simultaneously, cooling air is blown horizontally from the pipes 25 at the corners of the assembly of glass sheets 10, 11 and thereby partially counteracts the effect of the heating currents at the corners only. Since, in practice, the corners, i.e. the positions of application of the electric arcs, tend to be at a considerably higher temperature than the remainder of the periphery of the glass sheets, the cooling air acts to reduce the glass temperature at the corners and thereby reduces the tendency for the overhanging corners of the lower sheet to droop during the welding operation and form a bead which has to be removed by a subsequent grinding process. Indeed, it has been found, that the overhanging corners of the lower sheet remain self-supporting.

The four margins of the top sheet 10 are heated successively by switching the electrical heating current cyclically between the electrodes 20 until the entire marginal region of the sheet 10 is brought to a melted condition.

The margins of the lower sheet 11 have meanwhile been softened by conduction from the top sheet 10, and the softened margins of the assembled sheets 10, 11 then run together to constitute a continuous peripheral weld uniting the sheets. Simultaneously with the above heating step, the cooling air is continuously directed at the corners of the sheets 10, 11. The temperature of the air and its rate of flow are selected to avoid either excessive cooling of the corners of the sheets or other effects which would be detrimental to the resultant peripheral weld. Likewise, the angle of application of the cooling air is selected, and although in this example the air is applied horizontally, the air may be directed at an angle above or below the horizontal. The air would then be inclined downwardly or upwardly respectively at the corners of the sheets.

When the molten margins of the sheets 10, 11 have united the platens 17, 19 are raised by the jack, to lift the top sheet 10. The lower sheet 11 remains clutched to the lower vacuum platen 14, and the welded edge region is stretched as the desired air space is established between the sheets 10, 11. The hole 13 in sheet 11 permits air to flow into the air space so that the pressure in the air space remains equal to atmospheric pressure.

The sheets 10, 11 are then held stationary until the welded margins of the unit lose heat and solidify. When the weld is sufficiently solid to be capable of supporting the unit without any deformation, the vacuum holding each sheet to its adjacent platen is released, and the welded unit is transported out of the welding station for further processing.

Referring to FIG. 3, there is shown a combined electrode and cooling means, comprising a telescopic tube 30 in place of the rod 23, holder 21 and insert 22. The tube is formed of stainless steel and constitutes the electrode. The tube also comprises conveying means for the cooling air which is thus blown at the respective corner of the assembly of sheets 10, 11, in coaxial relation with the arc from the electrode. As most clearly shown in FIG. 1, the tube 30 is bent downwardly out of the welding station, and connected both to an air supply duct 31 and an electric supply lead 32 (see FIG. 1). The duct 31 has a section 33 of electrically insulating material to electrically isolate the air supply means from the conductive electrode.

The tube 30 is telescopic to allow its length to be altered for the welding of different sized units. However, the tube 30 may be a single length of tubing, if its length need not be varied. As in the case of the first type of electrode and cooling means, the operative end of the tube 30 is supported on a soapstone block 26.

The principle of operation of this second type of combined electrode and cooling means is the same as described above with respect to the first type.

Figure 4:
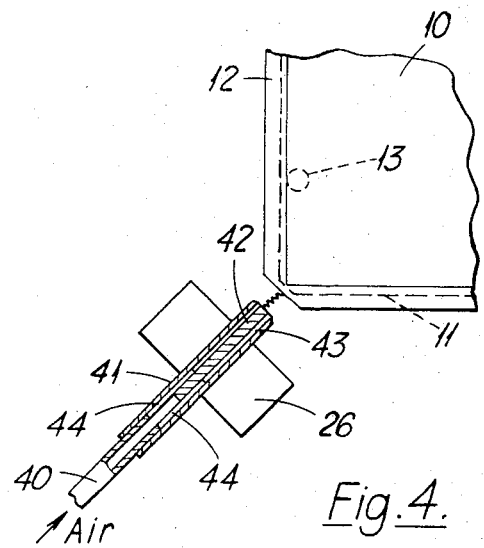
FIG. 4 is a plan view, partly in section, of another type of combined heating and cooling means.

FIG. 4 shows a type of combined heating and cooling means comprising a stainless steel supply tube 40 for cooling gas and electric current. The end of this tube 40 is received within an extension tube 41 and provides a socket for receiving one end of a carbon insert or a stainless steel rod 42 which extends in coaxial spaced relation with the extension tube towards the respective corner of the assembly of glass sheets to be welded. The insert or rod 42 is within the extension tube 41 and comprises the electrode and the annular space between the tube 41 and the insert or rod 42 comprises a passageway 43 for the cooling gas, the first-mentioned tube 40 having diametrically open-ended slots 44 allowing the cooling gas to pass from the tube 40 into the passageway 43. The other end of the tube 40 is connected to an air supply duct and an electric supply lead in the same manner as the tube 30 (see FIG. 1). Also, the precise working position of the insert or rod 42 and extension tube 41 is adjustable with respect to the tube 40 for the welding of different sized units. The principle of operation of this combined heating and cooling means is the same as for the means shown in FIG. 3.

Figure 5:
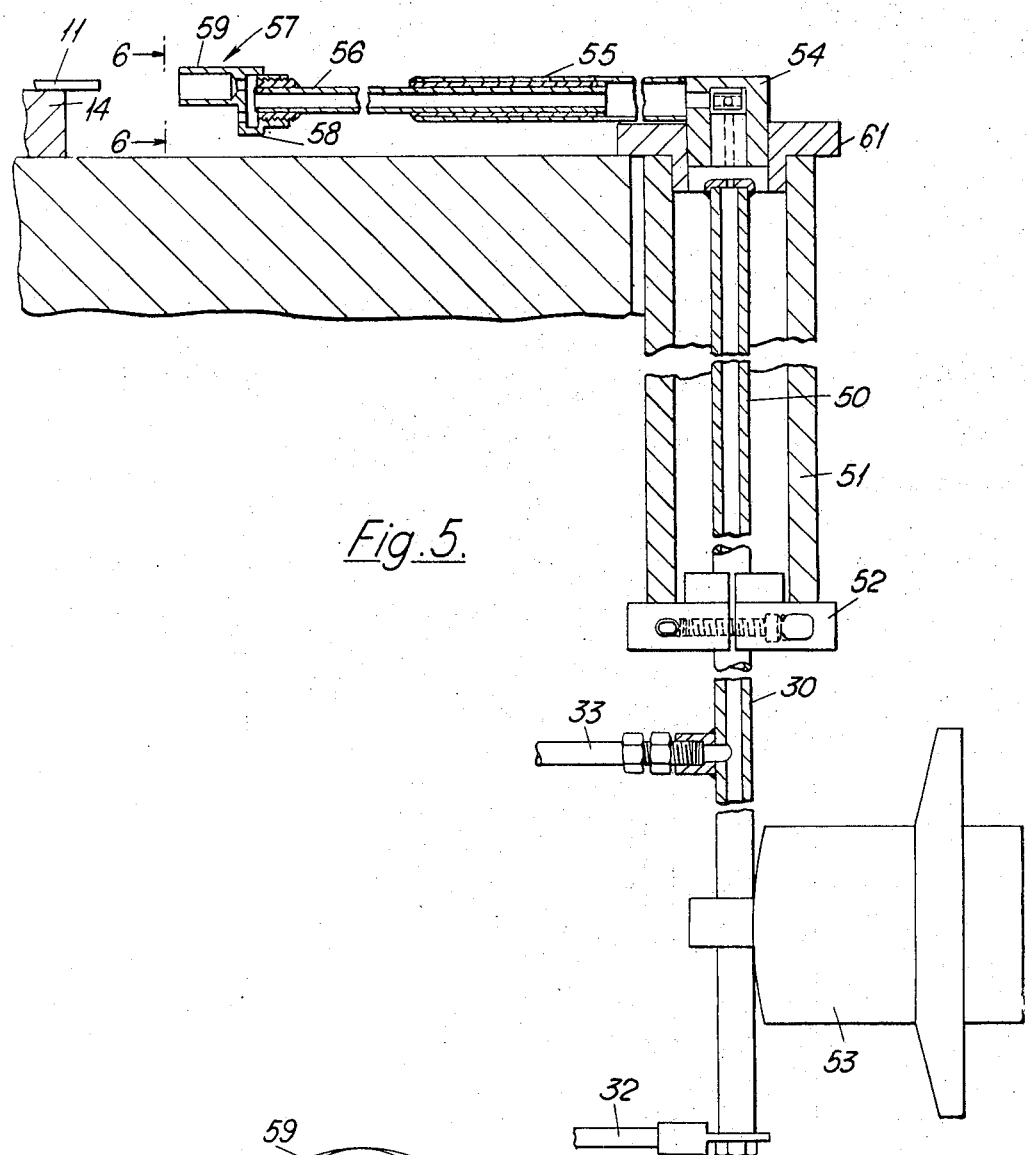
FIG. 5 is a side elevation, partly in section of another type of heating and cooling means.
Figure 6:
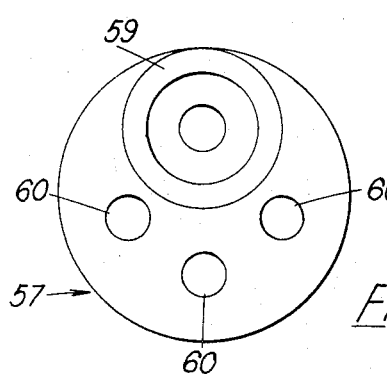
FIG. 6 is a view on the line 6—6 in FIG. 5.

FIGS. 5 and 6 show a further alternative form of the heating and cooling means. The arrangement is intended for mounting on the tube 30 shown in FIG. 1. The device comprises a hollow tube 50 mounted vertically within an insulating sleeve 51. The tubes 30 and 50 may be formed as one continuous tube. The sleeve 51 is secured to the tube 30 by a collar 52 formed in two halves and clamped around the tube 30. The tube 30 is connected to the air supply 33 and electric supply 32 and is mounted in position on an insulator 53. A swivel head 54 is rotatably mounted in a soapstone block 61 on top of the tube 50 and connects the interior of the tube 50 with a horizontal tube 55. A second horizontal tube 56 is slidable within the tube 55 forming a telescopic extension. Fixed on the free end of the tube 56 is an air nozzle 57. The nozzle 57 comprises a hollow cylindrical body 58 formed with a projecting sleeve 59. The passage through the sleeve 59 connects with the interior of the body 58 which in turn communicates with the interior of the tube 56. The sleeve 59 projects from the top of the body 58 and three air outlet apertures 60 (smaller than the outlet of the sleeve 59) are provided in the wall of the body 58 below the sleeve 59 as shown in FIG. 6. In use, a solid cylindrical graphite electrode may be mounted in the sleeve 59 for supplying electricity to the glass. Alternatively, the graphite electrode may have an axial bore communicating with the interior of the body 58 which acts as an additional air outlet. Alternatively, the nozzle 57 can be used without an electrode so that arcing occurs from the sleeve 59 itself. In each case, the nozzle 57 may be swivelled about a vertical axis to alter the direction in which the air is blown. Furthermore, the telescopic arrangement allows adjustment of the position of the nozzle 57 in relation to the glass sheets. In this way, different sizes of glass sheets can be accommodated.

As explained above, the cooling air effects a reduction in the temperature in the regions of glass which are heated directly by the arcs from the electrodes 20, and thereby reduces the tendency for these regions to droop. It has been found desirable to position the electrodes as near the corners as possible to reduce the likelihood of crazing occurring at the corners.

In each embodiment described above, the heating currents are passed successively between the electrodes 20 at adjacent corners of the assembly so that the margins of the top sheet are successively heated. The heating currents are thereby passed through any one margin in a succession of pulses. Alternatively, the heating currents may be passed between non-adjacent electrodes. In a preferred alternative, the heating currents are passed between diagonally opposite electrodes. Such a system is described in our copending Application Serial No. 81,340. In each case, the cooling gas at any one position may be directed at the glass either continuously throughout the heating stage, or insynchronism with the switched heating currents passed through the respective electrode at said one position, or only during the intervals between the passage of the heating currents through the respective electrodes.

In the case of passing current through diagonally opposite electrodes, it is preferred to blow onto diagonally opposite corners at times when the electrodes at those corners are not operating. In other words gas is blown onto pairs of diagonally opposite corners intermittently and out of phase with an intermittent supply of electricity to those corners. Seven or eight cycles of electrical supply may be fed to the electrodes and blowing is preferably commenced prior to the second heating cycle.

In some cases, the cooling gas may be applied to positions other than those to which the heating current is passed. However, in all cases cooling gas may be either continuously or intermittently directed towards the glass in the period commencing with the first firing of the electrodes and terminating with the final firing of the electrodes.

If desired, the upper vacuum platen 17 may be held to the clutch platen 19 by the resilient means described in our copending Application Ser. No. 43,881 now Pat. No. 3,690,856.

The above described methods may be used to make units of thin glass, such as 2 mm. thickness. Such glass is very prone to deformation at the support positions and so the use of cooling gas during the welding sequence is particularly advantageous in reducing the likelihood of such deformation. The corners of the unit may be supported on supporting blocks located below each corner of the unit. Whilst it is preferred to arc and cool at positions located at the corners it is possible to arc at positions marginally removed from the corners. Furthermore cooling may be carried out at any of a number of positions along the margins irrespective of whether these positions corresponded with an arcing region or a corner.

We claim:

1. A method of welding multiple glazing units having a plurality of glass sheets welded together comprising the steps of,
   (a) applying a readily dissipated electroconductive coating to the edge portion of one of said glass sheets,
   (b) placing the sheets in a closely spaced, face to face relationship,
   (c) connecting the electroconductive coating to electrodes at a plurality of positions located about the periphery of the glass sheet,
   (d) passing electrical current through the electroconductive coating causing the edge portions to soften and contact the second sheet forming a continuous weld therewith and the electroconductive coating to dissipate, and
   (e) directing a cooling gas at the weld during the passage of the electrical current therethrough.

2. A method according to claim 1 in which the cooling gas is directed at the weld at the positions to which the electrical currents are passed at the same time said currents are passed.

3. A method according to claim 1, wherein the electroconductive coating is connected to four electrodes and the electrical current is switched to pass between a first pair of electrodes and then between a second pair of electrodes.

4. A method according to claim 3, wherein the cooling gas is directed at the weld at any one of said electrodes continuously during the passage of the electrical currents.

5. A method according to claim 3, wherein the cooling gas is directed at any one of said electrodes only during the passage of electrical currents to the position of said one of said electrodes.

6. A method according to claim 3, wherein the cooling gas is directed at the weld at the second pair of electrodes during passage of the electrical currents through the first pair of electrodes.

7. A method according to claim 3, for welding rectangular glass sheets wherein one of the four electrodes is located at each corner of the rectangle and the electrical currents are alternately passed between pairs of electrodes at diagonally opposite corners of the glass sheets.

8. A method according to claim 7, wherein the flow of cooling gas is blown alternately onto the two pairs of diagonally opposite corners.

9. A method according to claim 8, wherein the cooling gas is directed onto one pair of diagonally opposite corners while the electrical currents are flowing through the electrodes at the other pair of diagonally opposite corners.

10. Apparatus for manufacturing welded multiple glazing units comprising;
(a) means to hold a first glass sheet in welding position,
(b) means to hold a second glass sheet in a closely spaced, face to face relationship with said first glass sheet,
(c) a plurality of electrode means located adjacent the periphery of the glass sheets for applying an electrical current thereto, each electrode means having an electrode concentrically mounted within a tube for supplying a cooling gas to the periphery of the sheets, said electrodes being movable with respect to said tubes along their longitudinal axes to facilitate adjustment with the periphery of the glass sheets.

11. The apparatus of claim 10, wherein the electrode means are located at each corner of generally rectangular glass sheets.

12. Apparatus according to claim 10, wherein the electrodes are mounted on swivel mountings so that the direction of the electrodes relative to the assembly of glass sheets may be adjusted.

References Cited

UNITED STATES PATENTS

| | | | |
|---|---|---|---|
| 3,658,502 | 4/1972 | Shepherd | 65—58 |
| 2,389,360 | 11/1945 | Guyer et al. | 65—40 |
| 3,628,935 | 12/1971 | Jansson et al. | 65—40 |
| 3,726,658 | 4/1973 | Banks | 65—40 |
| 3,273,986 | 9/1966 | Zukowski | 65—40 |
| 2,268,670 | 1/1942 | Rowci | 65—40 X |
| 3,522,026 | 7/1970 | Petrella et al. | 65—40 |
| 2,624,979 | 1/1953 | Clever et al. | 65—40 |
| 2,462,988 | 3/1949 | Morgan | 65—58 X |
| 3,510,285 | 5/1970 | Murray et al. | 65—40 |

FOREIGN PATENTS

| | | | |
|---|---|---|---|
| 1,405,536 | 7/1959 | Russia | 65—152 |

S. LEON BASHORE, Primary Examiner

K. M. SCHOR, Assistant Examiner

U.S. Cl. X.R.

65—58, 152, DIG. 4